US005640200A

United States Patent [19]
Michael

[11] Patent Number: 5,640,200
[45] Date of Patent: Jun. 17, 1997

[54] GOLDEN TEMPLATE COMPARISON USING EFFICIENT IMAGE REGISTRATION

[75] Inventor: David J. S. Michael, Newton, Mass.

[73] Assignee: Cognex Corporation, Natick, Mass.

[21] Appl. No.: 364,920

[22] Filed: Dec. 28, 1994

Related U.S. Application Data

[63] Continuation-in-part of Ser. No. 299,015, Aug. 31, 1994, Pat. No. 5,548,326, which is a continuation-in-part of Ser. No. 132,532, Oct. 6, 1994, abandoned.

[51] Int. Cl.$^6$ ...................................................... H04N 7/18
[52] U.S. Cl. .................... 348/87; 348/126; 348/130; 382/144; 382/151; 382/160
[58] Field of Search .................... 348/86, 87, 92, 348/94, 95, 126, 130; 382/144, 145, 150, 151, 160; H04N 7/18

[56] References Cited

U.S. PATENT DOCUMENTS

| | | | |
|---|---|---|---|
| 4,805,123 | 2/1989 | Specht et al. | 348/126 |
| 4,860,371 | 8/1989 | Matsuyama et al. | 348/126 |
| 5,548,326 | 8/1996 | Michael | 348/126 |

OTHER PUBLICATIONS

*ACM Computing Surveys*, vol. 24, No. 4, Dec. 1992, "A Survey of Image Registration Techniques," 27 pp.

*IEEE Transactions on Computers*, vol. C-21, No. 2, Feb. 1972, "A Class of Algorithms for Fast Digital Image Registration," 8 pp.

*Primary Examiner*—Howard W. Britton
*Attorney, Agent, or Firm*—Russ Weinzimmer

[57] ABSTRACT

Golden Template Comparison (GTC) is a method that can be applied to flaw and defect detection in images of 2-dimensional scenes. When a test image is compared to a golden template image, the images must be registered, and then subtracted. The resulting difference image is then analyzed for features that indicate flaws or defects. The registration step is a major determinant of the performance of GTC, and the invention performs the registration step of GTC using a highly efficient and accurate registration method. The registration method of the invention provides substantial registration of all of the features common to the test image and the golden template image, even when one of the images to be registered is flawed, using a registration metric based on minimization of the sum of the absolute value of the differences between the images to be registered, and an efficient optimization technique, such as a version of gradient descent, wherein a local minimum in a registration metric space is found to the nearest pixel using less computational resources than needed to compute the entire registration metric space.

35 Claims, 6 Drawing Sheets

GOLDEN TEMPLATE COMPARISON USING EFFICIENT IMAGE REGISTRATION

CROSS-REFERENCES TO RELATED APPLICATIONS

This application is a continuation-in-part of application Ser. No. 08/299,015 filed on Aug. 31, 1994, now U.S. Pat. No. 5,548,326, which is a continuation-in-part of Ser. No. 132,532 filed Oct. 6, 1993, now abandoned.

FIELD OF THE INVENTION

This invention relates generally to machine vision, and particularly to flaw and defect detection based on comparison of digitized images acquired by a machine vision system.

BACKGROUND OF THE INVENTION

Accurate and efficient registration is important in a variety of contexts. For example, many phases of microelectronic fabrication require some form of alignment and/or registration, i.e., precise relative positioning. From photolithography through final packaging of a semiconductor chip, high yield depends on the precise relative positioning of semiconductor components and production equipment. In particular, alignment and/or registration techniques play a key role in mask registration, stepping, dicing, die picking, die bonding, wire bonding, and optical inspection, for example. Thus, improvements in the speed, precision, and repeatability of alignment and registration systems can directly improve productivity.

Machine vision technology can provide greater speed and accuracy than standard registration techniques by first representing the objects to be registered by corresponding digitized or quantized images. The digitized images of the objects to be registered are captured by a video camera, and are then compared using digital image analysis.

Mathematically, an image is a discrete, two-dimensional function $I(x,y)$, where the value of the function at each point $(x,y)$ represents one of a plurality of possible shades of gray. Both the coordinates $x$ and $y$ and the shades of gray are represented by integers that fall within a range of values, i.e., are quantized. Typically, an image is a rectangle having a width and a height. Each point $(x,y)$ in the image $I(x,y)$ is called a "pixel", and is associated with a quantized gray value, e.g., an integer $I(x,y)$ that is falls within the range $0 \leq I(x,y) \leq 255$. The quantized gray value of each pixel is usually a function of the radiance (power per unit solid angle per unit projected area) of a corresponding point in the scene that the image represents.

A "model" or "template" is similar to an image, except that it need not be rectangular, or even simply connected, i.e., it may consist of a collection of regions. A model can be treated like an image where each pixel in a rectangular region that includes the collection of regions can be assigned a gray value when the pixel is within one of the regions, or a "don't care" symbol when the pixel is not within one of the regions. Note that a "don't are" symbol is not the same as a zero.

Alignment shall be defined as orienting a first object with respect to a second object so as to make at least one alignment parameter of the first object, such as planar position or angular orientation, substantially equal to the corresponding alignment parameter of the second object. For example, a collection of pencils on a desk are aligned when they are all oriented in the same direction.

Alternatively, given two sheets of paper on the desk, each having a dot printed thereon, the dots are aligned when a dot of the first sheet overlays a dot on the second sheet, i.e., the dots occupy the same protective position, regardless of the relative rotational orientation of the two sheets.

Registration of a pair of objects shall be defined as orienting a first object with respect to a second object so as to make all alignment parameters of the first object substantially equal to the corresponding alignment parameters of the second object. For example, a first semiconductor fabrication mask is said to be registered with an overlaying second semiconductor fabrication mask when either a single fiducial mark on the first mask is located at the same projective position as the corresponding fiducial mark on the second mask, or more than one fiducial on the first mask is aligned with respect to the corresponding fiducial mark on the second mask.

Alternatively, alignment can be defined as imprecise registration. For example, an alignment step for coarse relative positioning can be followed by a registration step to achieve fine, or more precise relative positioning.

A known approach commonly used for registration of digitized images is called "normalized correlation". In the fields of pattern recognition and machine vision, "correlation" refers to the degree of similarity between a first image and a second image, where it shall be assumed that an "image" is a digitized, monochromatic rendition of an object. For purposes of registration, even two identical images are deemed to be dissimilar if they are not registered, due to the nature of the computation of the correlation coefficient, as will be discussed below. Moreover, the correlation coefficient indicates the degree of misregistration between the two images.

The correlation coefficient $r$ of a first image M and a corresponding portion of a second image I at an offset $(u,v)$ is given by:

$$r(u,v) = \frac{\left[ N \sum_i I_i M_i - \left(\sum_i I_i\right)\left(\sum_i M_i\right) \right]}{\sqrt{\left[ N \sum_i I_i^2 - \left(\sum_i I_i\right)^2 \right]\left[ N \sum_i M_i^2 - \left(\sum_i M_i\right)^2 \right]}} \quad (1)$$

where $I_i = I(u+x_i, v+y_i)$. The value of $r(u,v)$ is always in the range: $-1 \leq r(u,v) \leq 1$. A value of 1 or $-1$ signifies a "perfect match" of a first image with a second image.

Two version of the normalized correlation coefficient $n(u,v)$ are given by:

$$n(u,v) = r^2(u,v) \quad (2a)$$

or $$n(u,v) = \max(r(u,v), 0)^2 \quad (2b)$$

In equation (2b), the "max" function forces all negative values of $r(u,v)$ to 0.

The normalized correlation function of a pair of images is the set of correlation values at all positions $(u,v)$ such that $I_i$ is a valid image pixel for all values of $i$. The correlation function will typically be a rectangular array of correlation values.

Assuming neither image of the image pair to be registered is flawed, registration of the two images of the image pair is achieved when the relative displacement of the two images causes the function $n(u,v)$ to be maximized. Perfect registration requires that the local maximum also be the global maximum. The global maximum of the function n(u,v) is the point where n(u,v) takes on its largest value over all allowed values of u and v. A local maximum of n(u,v) is a point where the value of n(u,v) is larger than any of the values in some defined neighborhood of the point. Thus, the global maximum is also a local maximum. Multiplying n(u,v) by −1 has the effect of converting all local maxima into local minima, and all local minima into local maxima.

The use of normalized correlation for registration of a first image with respect to a second image is problematic when at least one of the images is flawed. An image is deemed to be flawed when it does not accurately represent the object it was intended to represent. For example, a flawed image can result from aberrant illumination of the object, such as lighting that creates a dark shadow or an excessively bright spot due to a highly reflective portion of the object. A flawed image of an object can also result when the object is obscured by another object. Also, if the object itself is flawed, such as might result from a processing or other manufacturing error, a flawed image results. In this case, the flawed image may accurately represent the flawed object, but nevertheless deviates from the image of what an unflawed object would be.

When at least one of the images to be registered is flawed, registration based on normalized correlation results in either poor registration, or misregistration, i.e., most of the features that can be found in both images are not in registered relationship. It obvious that if a feature is absent from a flawed image, it is impossible to register it with a corresponding feature in the other image. Nevertheless, it is desirable that a registration method provide substantial registration of all of the features common to both images, even when one of the images to be registered is flawed.

Golden Template Comparison (GTC) is a method for comparing a test image to an ideal reference image, called a golden template. A whole-pixel registration step must be performed both when the golden template is created, and when the test image is compared to the golden template. Such registration can be problematic using known registration methods, such as a registration method that employs normalized correlation, when a portion of the test image is occluded.

SUMMARY OF THE INVENTION

Golden Template Comparison (GTC) is a method that can be applied to flaw and defect detection in images of 2-dimensional scenes that do not suffer from geometric distortion. A test image is compared to a golden template image that is the mean of a plurality of good sample images. To perform the comparison, the test image and the golden template image must be registered, and then subtracted. The resulting difference image is then analyzed for features that indicate flaws or defects.

In practice, it is found that the registration step is a major determinant of the performance of GTC. The invention performs the registration step of GTC using a highly efficient and accurate method.

The registration method of the invention provides substantial registration of all of the features common to the test image and the golden template image, even when one of the images to be registered is flawed. Thus, a special registration target need not be chosen; the entire image can be used for registration.

The invention features the use of a registration metric based on minimization of the sum of the absolute value of the differences between the images to be registered. Also employed is an efficient optimization technique, such as a version of gradient descent, wherein a local minimum in a registration metric space is found to the nearest pixel using less computational resources than needed to compute the entire registration metric space.

BRIEF DESCRIPTION OF THE DRAWINGS

The invention will be more fully understood from the following detailed description, in conjunction with the accompanying figures, wherein.

DETAILED DESCRIPTION OF THE DRAWINGS

Figure 1A:
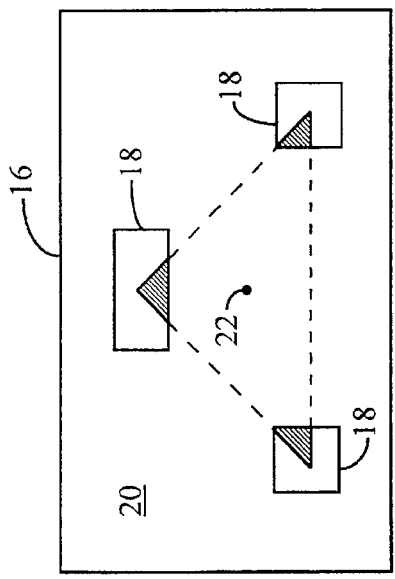
FIG. 1A is a representation of a rectangular binary first image of a triangle, and a pair of orthogonal cross-hairs indicating the location of the centroid of the triangle.

With reference to FIG. 1, a representation of a rectangular binary first image 10 of a triangle 12 is shown. Although the image 10 is binary, the method and apparatus of the invention can be applied to images having pixels associated with more than one of two possible gray levels, e.g., one of 256 gray levels. In fact, the method and apparatus of the invention is even better- suited for use with such "gray scale" images. Thus, the image 10 is binary solely for illustrative purposes, and is not intended to limit the scope or applicability of the present invention.

The triangle 12 is characterized by a centroid, the position of which is indicated by the intersection point of a pair of orthogonal cross-hairs 14. In the case of a planar figure such as the triangle 12, the centroid corresponds to the center of mass of a similarly shaped thin plate of uniform thickness and consistency. The centroid of the triangle 12 can be used to determine a convenient initial relative displacement with respect to a second image to be brought into registered relationship by overlaying the centroid of the second image with the centroid of the triangle 12. Alternatively, other points in an image can be used to determine a convenient initial relative displacement, such as the point defined by the position of the cross-hairs 14 wherein an equal number of pixels falls on each side of each cross 17 hair 14, for example.

Figure 1B:
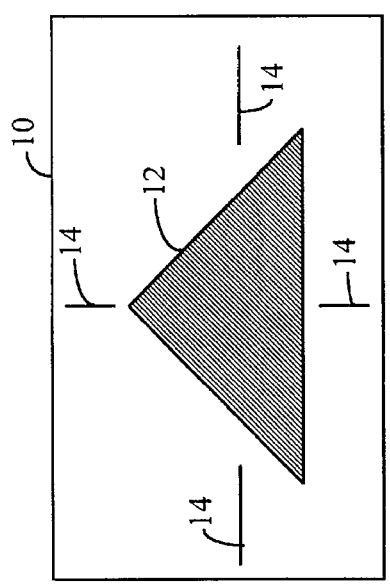
FIG. 1B is a representation of a rectangular binary first image that includes a plurality of portions of the image of FIG. 1A, each portion being enclosed within a window, the remainder of the image being a "don't-care" region, and a dot indicating the location of the centroid of the triangle.

Referring to FIG. 1B, a representation of an alternate rectangular binary first image 16 is shown that includes a plurality of portions of the image 10 of FIG. 1A, each portion being enclosed within a window 18. The remainder of the image 16 is a "don't-care" region which includes "don't care" pixels that are excluded from consideration when registration is determined according to the present invention. A dot 22 indicates the location of the centroid of the image 16. FIG. 1B is included to illustrate that the method and apparatus of the present invention can be applied to an image that includes a "don't-care" region.

Figure 2:
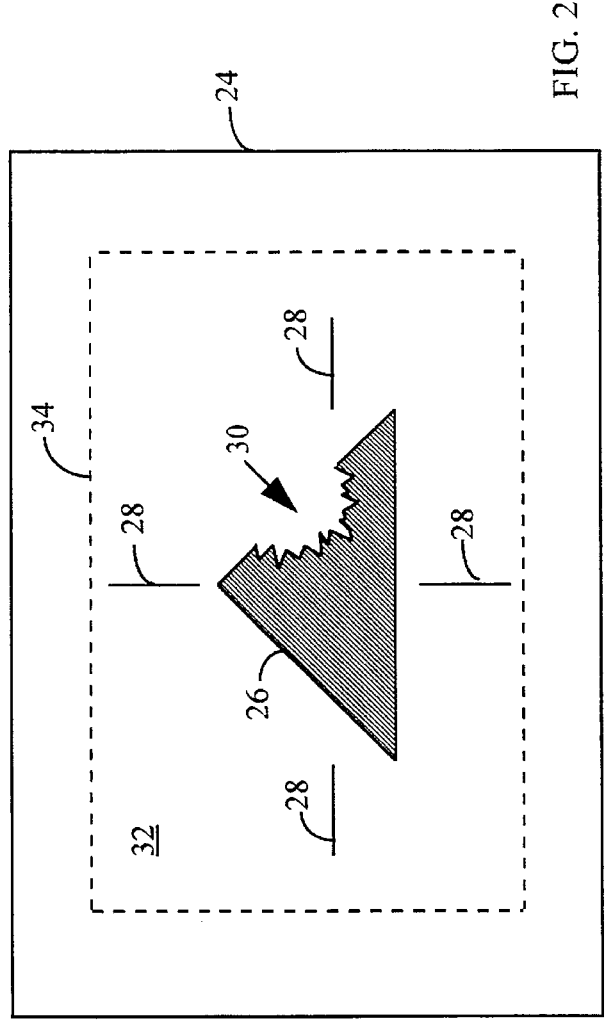
FIG. 2 is a representation of a flawed rectangular binary second image of a triangle, and a pair of orthogonal cross-hairs indicating the location of the centroid of the triangle.

FIG. 2 shows a flawed rectangular binary second image 24 of a triangle 26, and a pair of orthogonal cross-hairs 28 indicating the location of the centroid of the triangle 26. For illustrative purposes, the triangle 26 includes a flaw 30, such as a missing portion, an overlap, or any other substantial deviation from the intended ideal image shape, such as a specularity (a highly reflective region of the object represented by the image), or a lens flare.

A search area 32 within the image 24 is defined by a search area boundary 34. The search area 32 is the area of the second image 24 over which the first image 10 can be displaced for bringing the first and second images 10 and 24 into registered relationship. Although the centroid of the triangle 12 can be used to determine a convenient initial relative displacement of the first image 10 with respect to the second image 24 for bringing the first and second images into registered relationship, the first image 10 can be initially displaced anywhere within the search area 32, provided that the image 10 does not extend at all beyond the boundary 34. Even if optimum registration can be achieved by displacing the first image 10 with respect to the second image 24 such that a portion of the first image does extend beyond the boundary 34, in a preferred embodiment of the invention, the coordinates of the first image 10 are returned as the resulting registration parameters when a portion of the first image extends over the boundary 34 as a result of a gradient descent, or other two-dimensional numerical optimization approach.

Figure 3:
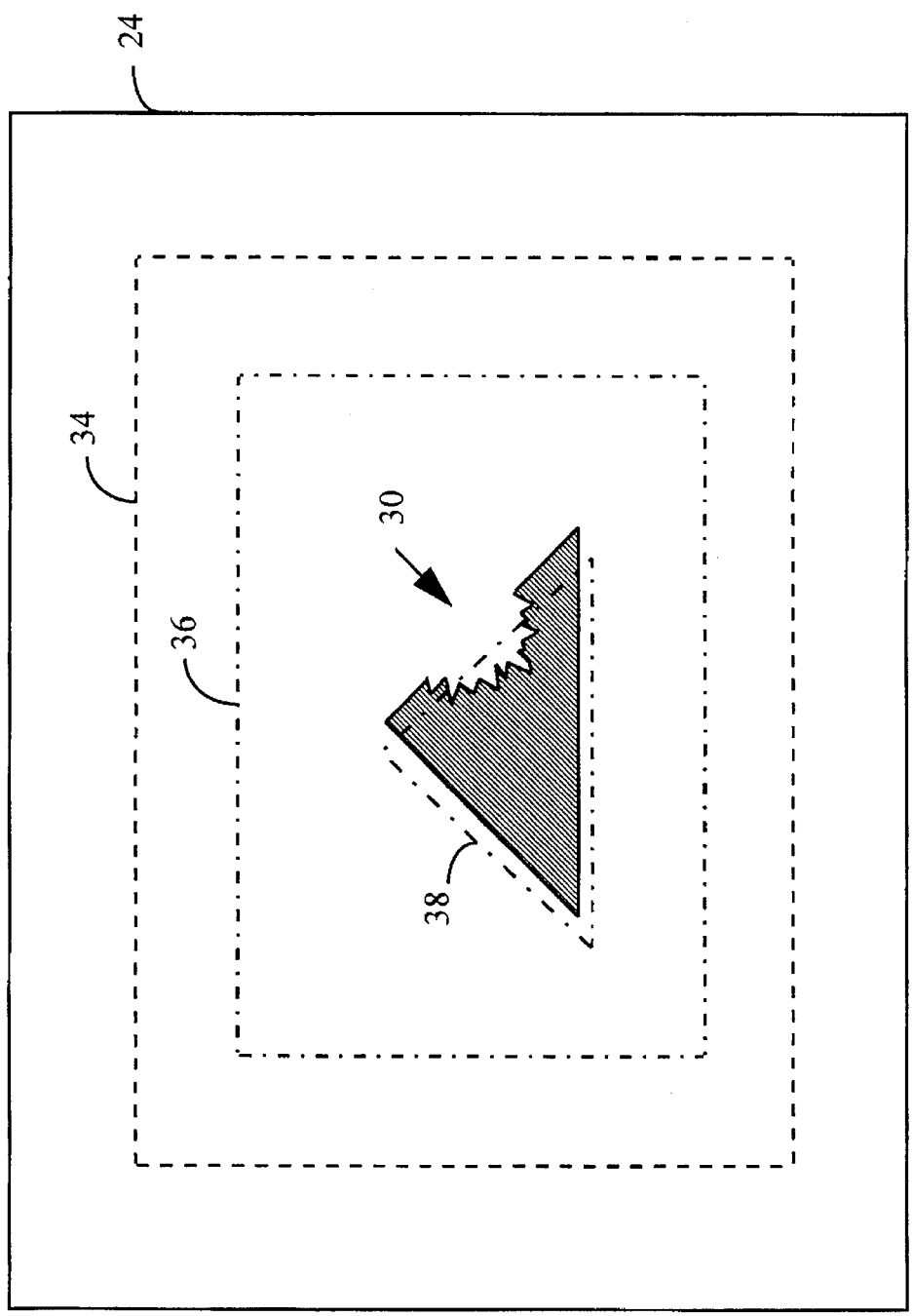
FIG. 3 is a phantom of the rectangular binary first image of a triangle of FIG. 1 superimposed and relatively displaced with respect to the representation of the rectangular binary second image of the triangle of FIG. 2, also showing a search area within the second image.

FIG. 3 shows a phantom 36 of the rectangular binary first image 10, having a phantom triangle 38 corresponding to the triangle 12, superimposed upon and displaced relative to the rectangular binary second image 24 such that the centroid of the phantom 36 overlays the centroid of the second image 24. Note that the phantom image 36 falls within the search area 34 of the second image 24.

An objective of the invention is to bring the first image 10, as indicated by the phantom image 36, into registered relationship with the second image 24, even though the second image 24 includes the flaw 30. One advantage of the present invention is that the effect of image flaws is minimized, as compared with prior art approaches, such as Normalized Correlation, which tends to exaggerate the effect of image flaws, resulting in failed registration attempts.

The effect of image flaws is minimized, as compared with prior art approaches, such as Normalized Correlation, due to the use of a metric that is linear in the gray values of the pixels of the images to be registered. For example, a useful metric is the Sum of Absolute Differences (SAD) metric.

The Sum of Absolute Differences SAD(u,v) of a first image M and a corresponding portion of a second image I at an offset (u,v) is given by:

$$SAD(u,v) = \sum_i |I_i - M_i| \qquad (3)$$

where $I_i=I(u+x_i,v+y_i)$.

Note that in contrast with the metric used in Normalized Correlation, shown in equation (1), the Sum of Absolute Differences metric does not include any squared terms. Although squared terms do confer certain advantages, as recognized by the prior art, it is a contribution of the present invention to recognize that squared terms in an image registration metric can often result in erroneous registration when one or both of the images to be registered include one or more image flaws. As also recognized by the invention, the squared terms result in an excessive sensitivity to image flaws that impedes or precludes registration.

Also note that the Sum of Absolute Differences metric can be modified by including a normalization factor, such as one based on the average gray values of the first and second images, without introducing the problems associated with non-linearities, such as the squared terms of the Normalized Correlation metric. One feature of a normalized Sum of Absolute Differences metric is that such a metric is insensitive to constant changes in image brightness.

Moreover, in the prior art, the Normalized Correlation metric is sometimes used in conjunction with a training step for one of the images that consumes computational time. By contrast, the invention employs the Sum of Absolute Differences metric such that there is no need for a training step. Thus, there is no computational time penalty for exchanging one or more of the images to be registered for each alignment step in a sequence of alignment steps.

Figure 4:
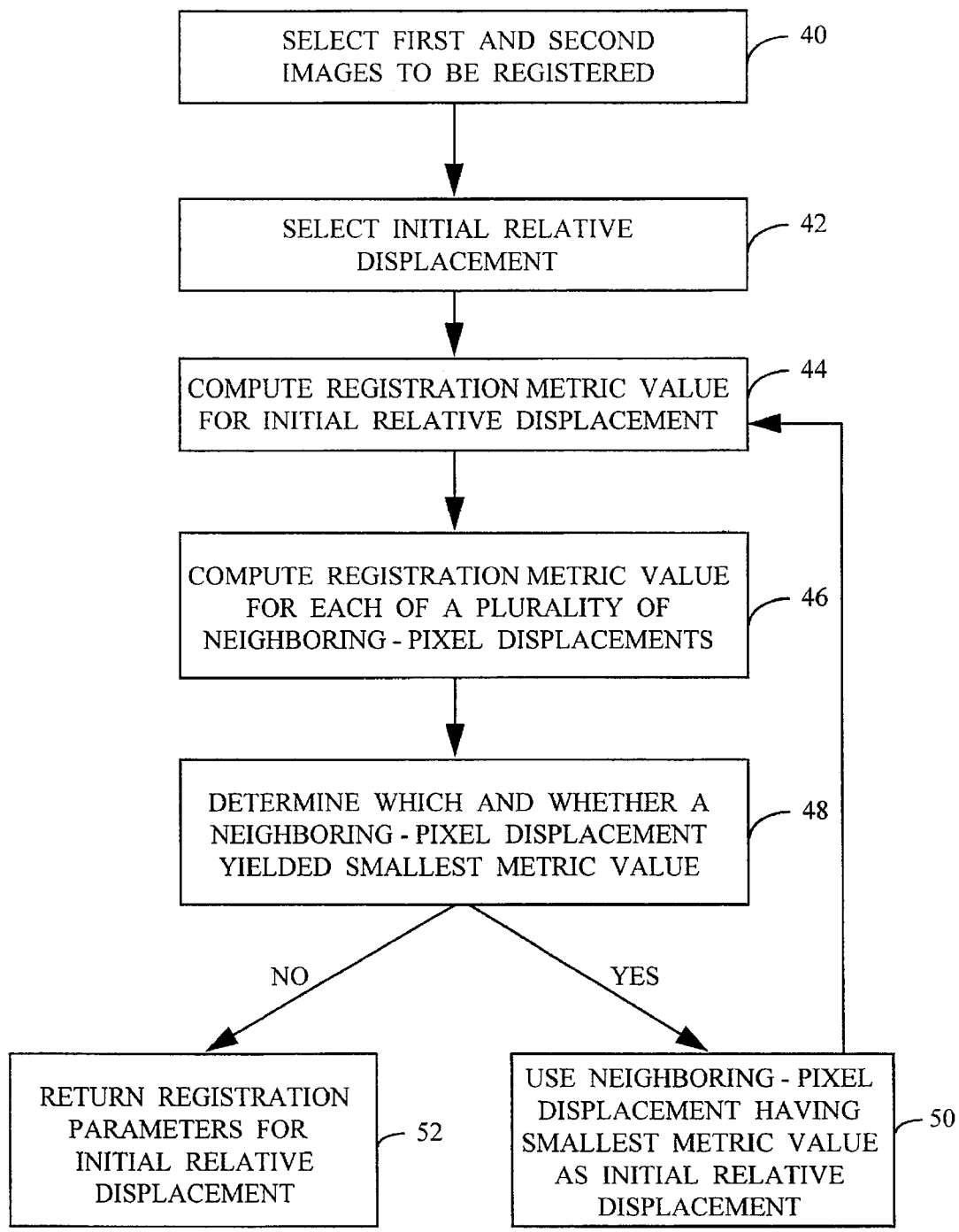
FIG. 4 is a flow chart of a preferred embodiment of the method of the invention.

Referring to FIG. 4, to efficiently register a pair of digitized images, each including a plurality of pixels, each pixel being associated with at least a gray value or a don't-care symbol, the invention provides a method and apparatus that employs the Sum of Absolute Differences metric of Equation (3), and a two-dimensional numerical optimization technique, such as gradient or steepest descent. In particular, the first step (40) of the method is to select the first and second images to be registered. The first image can be any gray-scale image, including a binary image, such as the black-and-white image 10. The first image can also include regions of "don't-care" pixels that surrounds each of a plurality of windows that each enclose a plurality of gray-scale pixels. The windows can overlap, and there is no restriction on the number of windows. The "don't-care" regions can be arranged so that the image selected does not include certain predictable image flaws, such as a recurring specularity, thereby improving registration performance. Nevertheless, sometimes it is not possible to compensate for image flaws using don't-care regions. In such instances, the invention is particularly useful.

The next step (42) includes selecting an initial relative displacement between the first image 10 and the second image 24 such that a plurality of pixels of the first image 10 are in overlapping relationship with a plurality of pixels of the second image 24. One way to accomplish this is to overlay the centroid of the first image upon the centroid of the second image. Another approach is to find the geometric center of each image, and overlay the center of the first image on the center of the second image. Any other approach that ensures that a plurality of pixels of the first image are in overlapping relationship with a plurality of pixels of the second image would also be effective. If an a priori best estimate of the correct registration to the nearest pixel is available, it is preferable to use it as the basis for the initial relative displacement. In another preferred embodiment, a search area within the second image is defined. For example, a search area may be chosen that allows misregistration of up to +/−2 pixels in the x direction and +/−5 pixels in the y-direction. Preferably, the two images should be relatively displaced such that each pixel of the first image falls within the search area of the second image.

Figure 5:
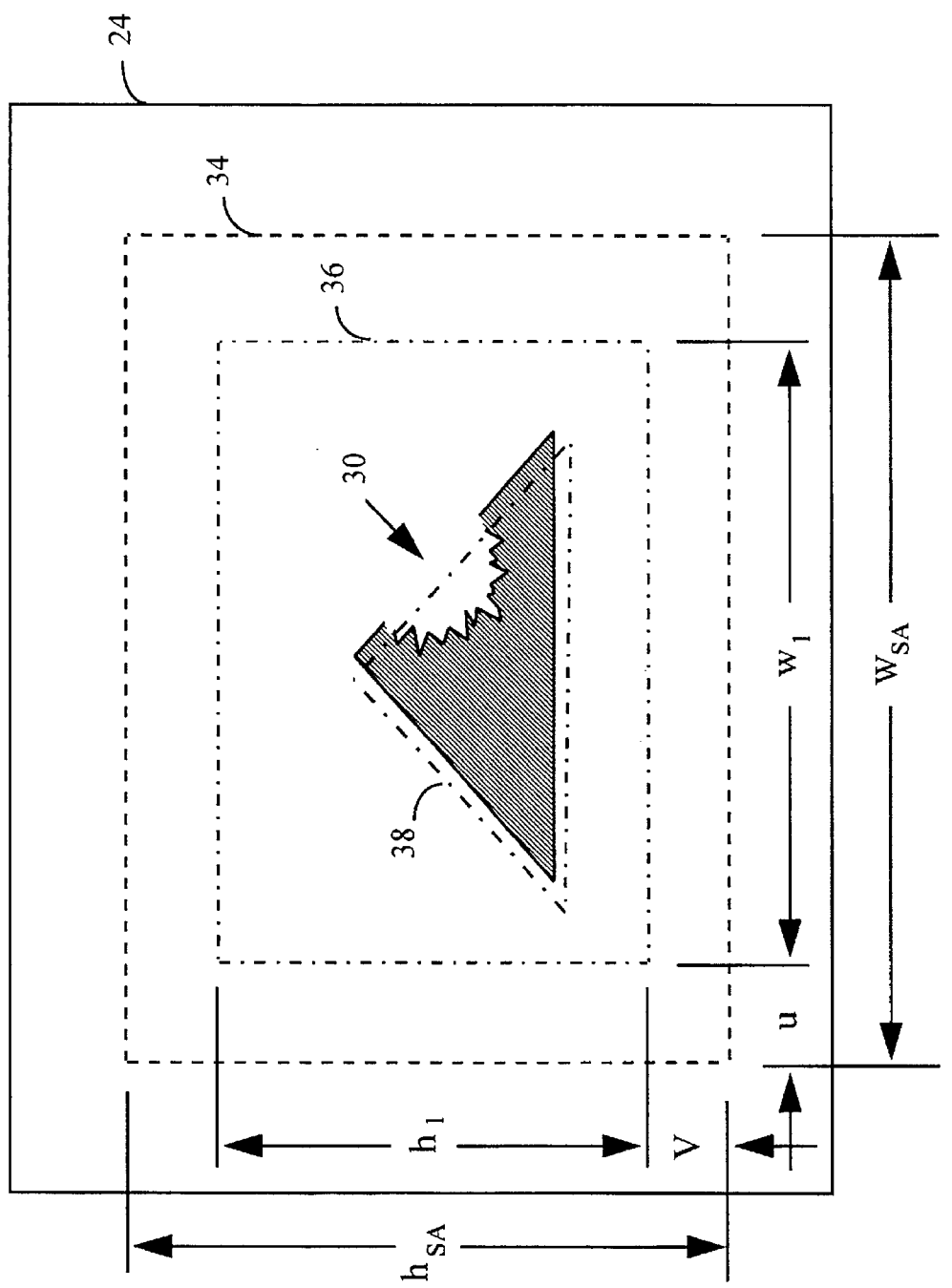
FIG. 5 includes all of FIG. 3, also showing the dimensions $w_1$ and $h_1$ of the first image, the dimensions $W_{SA}$ and $h_{SA}$ of the search area of the second image, and the extent of the relative displacement therebetween as represented by the variables u and v.

FIG. 5 illustrates an initial relative displacement, and shows how a relative displacement can be specified using the variables u and v. When u and v are both equal to zero, the lower left corner of the first image is flush in the lower left corner of the search area 32. Conversely, when u and v assume their maximum values of $W_{SA}-W_1$ and $h_{SA}-h_1$, respectively, the upper right corner of the first image is flush in the upper right corner of the search area 32. Here, $W_{SA}$ is the width of the search area 32, $w_1$ is the width of the first image, $h_{SA}$ is the height of the search area 32, and hi is the height of the first image, each dimension being shown in FIG. 5.

Figure 6:
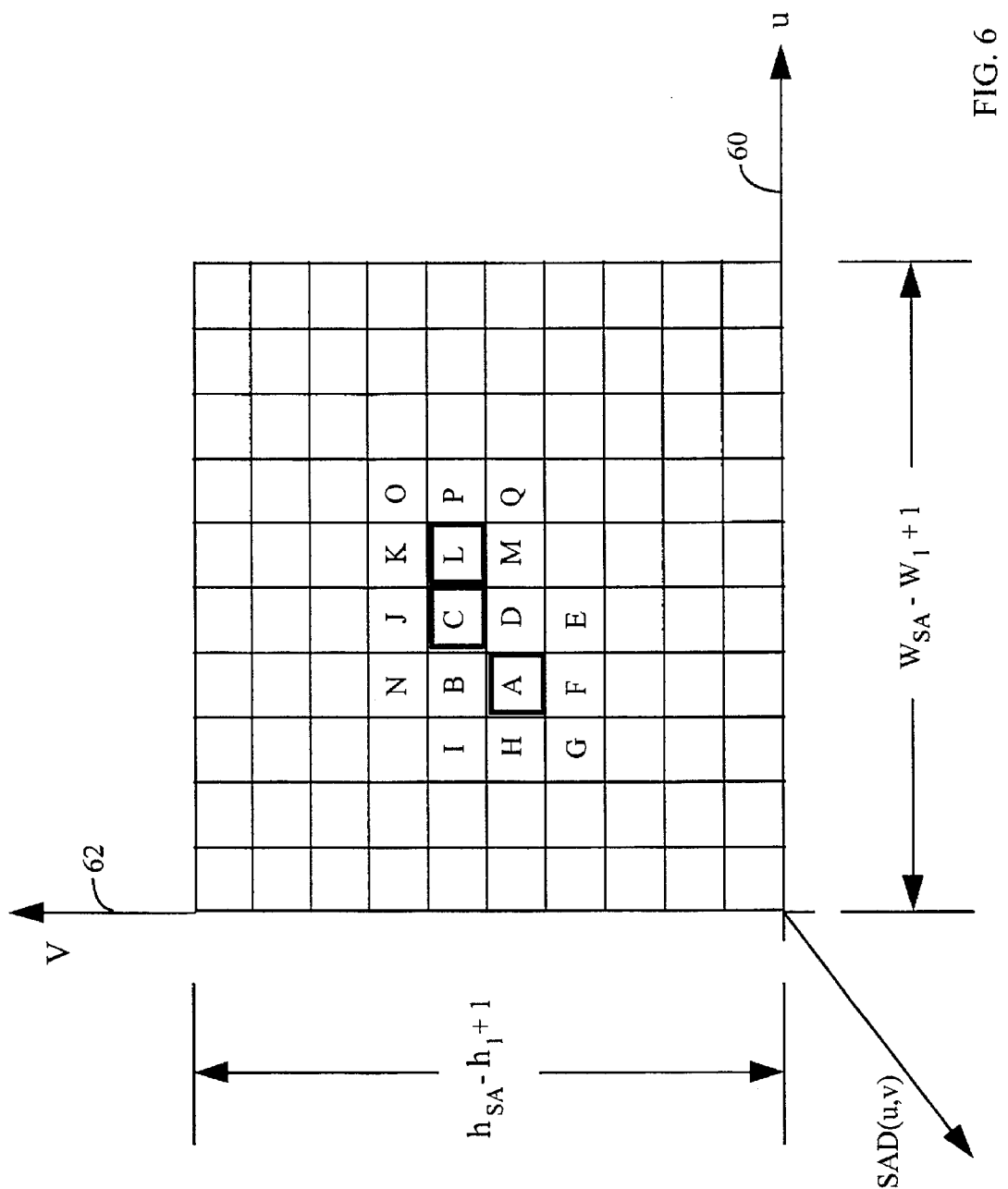
FIG. 6 is a graph of the variables u and v of FIG. 4, each being quantized according to a size of the pixels of the first and second images, and a metric surface variable $M_{uv}$, that is a function of the variables u and v, also showing a plurality of relative displacement positions A through Q.

Referring again to FIG. 4, and also to FIG. 6, in the next step (44), a registration metric value is computed for the image pair in the initial relative displacement position using a linear registration metric computation, such as the Sum of Absolute Differences metric SAD(u,v) of Equation (3), which is a function of u and v, i.e., the relative displacement between the first and second images M and I. In FIG. 6, the initial relative displacement position is marked with the letter 'A', and is characterized by a discrete value of u and a discrete value of v. The value of the metric SAD(u,v) can be represented as the height above the plane defined by the u and v axes 60 and 62, respectively. Thus, the range of values of the metric SAD(u,v) over the domains of u and v ($W_{SA}-W_1+1$ and $h_{SA}-h_1+1$, respectively) can be viewed as being a surface. This surface (not shown) can have both minima and maxima, which can be either local or global. (By definition, a global minimum is the lowest minimum among all the local minima.)

To implement the metric of Equation (3), the difference is computed between the gray value of each pixel of the first image and the gray value of the pixel of the second image that is in overlapping relationship with the each pixel of the first image. Next, the absolute value of the difference is computed, which step can advantageously be executed using specialized computational circuitry that has been engineered to perform this type of calculation more rapidly than a general-purpose microprocessor, such as the "VC-2" chip, by Cognex Corporation, Natick Mass.

Next, the sum of absolute differences is obtained by computing the summation of each absolute value computed for each pixel of the first image that is in overlapping relationship with a pixel of the second image. This step of "computing the summation of each absolute value" can advantageously be executed within specialized computational circuitry that has been engineered to perform this type of calculation more rapidly than a general-purpose microprocessor, such as the "VC-1" or the "VC-3" chip, each also by Cognex Corporation.

The sum of absolute differences that is computed for the initial relative displacement is a single number that represents how well the first image is registered with respect to the second image at that particular relative displacement.

In the next step (46), a registration metric value is computed for each of a plurality of neighboring-pixel displacements using the registration metric computation of Equation (3). For example, in FIG. 6, the initial relative displacement A is surrounded by a plurality of neighboring-pixel relative displacements B, C, D, E, F, G, H, and I. In an alternate embodiment, only B, D, F, and H are used. In general, "neighboring-pixel displacements" can include pixels that are more than one pixel away from the initial relative displacement.

The next step (48) is to determine which displacement among the plurality of neighboring-pixel relative displacements and the initial relative displacement resulted in the smallest registration metric value. If the displacement that resulted in the smallest registration metric value is one of the plurality of neighboring-pixel displacements, steps (44), (46), and (48) are repeated, one of the neighboring-pixel displacements is used as the initial relative displacement, as shown in step (50). For example, in FIG. 6, the relative displacement C is used as the initial relative displacement in step (44), and then the relative displacements labeled by j, K, L, M, D, A, B, and N are treated as the neighboring-pixel relative displacements in step (46). Similarly, in a subsequent iteration, the relative displacement L
can then be used as the initial relative displacement in step (44), and then the relative displacements labeled by K, 0, P, Q, M, D, C, and J are treated as the neighboring-pixel relative displacements in step (46)

If the initial relative displacement A has a lower registration metric value than any of the plurality of neighboring pixel displacements, then the registration metric value represents at least a local minimum in the possible values of SAD(u,v), and the initial relative displacement A would probably at least provide adequate registration. Consequently, registration parameters for placing the pair of digitized images in registered relationship according to the initial relative displacement A would be returned, as shown in step (52).

In a preferred embodiment, the registration parameters can be used for computing sub-pixel registration parameters using, for example, parabolic interpolation. A preferred method of sub-pixel registration includes considering five difference metric values: the metric value at the final initial relative displacement, and the metric values of the four neighboring-pixel relative displacements immediately above, below, right, and left of the final initial relative displacement. These values are used to independently calculate the sub-pixel offsets along the u and v axes 60 and 62, respectively. Specifically, along the u axis, the final initial relative displacement and its left and right neighboring pixel displacements are used. A parabola is then "fit" to the points, and the minimum of that parabola is found, using techniques well-known in the art. The u-coordinate of the minimum is the sub-pixel registration parameter along the u-axis 60. An analogous approach is taken to find the v-coordinate of the sub-pixel registration parameter. Of course, other interpolation methods can be used, such as bi-linear or cubic interpolations, and larger "supports" could be used, such as using more than four neighboring-pixel relative displacements.

In applications where registration is performed for the purpose of flaw or defect detection, instead of, or in addition to, returning registration parameters (52), a difference image can be generated by subtracting the first image from the second image, or vice versa. The difference image can then be used to detect defects, or measure the size, shape, and/or position of flaws. Sub-pixel interpolation can be performed before or after the image subtraction step, depending on the application. For example, in a Golden Template analysis, the sub-pixel interpolation would be performed before subtracting.

In a preferred embodiment, the second image is at least as large as the first image, and the initial relative displacement between the first image and the second image is selected such that each of the pixels of the first image is in overlapping relationship with at least one pixel of the second image.

Referring to FIG. 6, efficiencies in execution speed can be achieved by avoiding repetitious calculation of the registration metric values. Specifically, if the metric values are stored in association with the relative displacement upon which the value is based, then upon a subsequent iteration when a different pixel is used as the initial relative displacement, the metric value for relative displacements that have already been calculated can be retrieved from memory, rather than recalculate them. For example, when pixel A is the initial relative displacement, the metric values for the pixels B, C, D, E, F, G, H, and I are also calculated. Thus, when pixel C is the initial relative displacement, the metric values for pixels A, B, C, and D do not need to be recalculated if they have been previously stored.

In summary, the method and apparatus of the invention for efficient registration of a pair of digitized images obtains a registration metric value based upon the Sum of Absolute Differences registration metric computation for each of a plurality of neighboring-pixel relative displacements, and iteratively selects a new initial relative displacement from among the plurality of neighboring-pixel relative displacements such that each succeeding new initial relative displacement is associated with a smaller registration metric value, until an initial relative displacement that is associated with a minimum registration metric value is reached.

More generally, the relative displacement that is associated with a minimum registration metric value is located using a two-dimensional numerical optimization analysis. In a preferred embodiment, the two-dimensional numerical optimization analysis is a gradient descent analysis, one version of which has been described above, and in another preferred embodiment, the two-dimensional numerical optimization analysis is a steepest descent analysis.

The invention is especially useful for use in flaw and defect analysis, such as Golden Template Comparison, "third optical" inspection, as well as pair-wise comparison of die images on a semiconductor wafer.

Golden Template Comparison (GTC) is a method for comparing a test image to an ideal reference image, called a golden template. The golden template image is created from an ensemble of various acceptable images using a statistical computation. The method is particularly suited to flaw and defect detection using 2-D digitized images of 2-D scenes that do not suffer from geometric distortion (rotation, scale, or skew). Such scenes commonly occur in conjunction with highly repeatable and rapid reproduction processes, such as semiconductor production, printing, and some graphic arts applications.

To be detected by GTC, a defect in an object must cause a change in the greyscale values of the pixels in the test image of the object. Thus, in the context of GTC, a defect is any change in grey scale value of one or more pixels of the test image beyond the normal expected variation of the acceptable images. A defect can be an erroneous or unwanted mark on an object, an incorrectly shaped feature, a surface of the wrong color, or the absence of a feature or object.

For example, GTC can be used to detect many kinds of defects particular to a wide variety of applications, such as in the production of printed material, e.g., a product label. Typical defects include streaks, wrinkles, blotches, or faded or absent features. In the production of an integrated circuit, typical defects include electrical shorts, nitride voids, or scratches.

Figure 7:
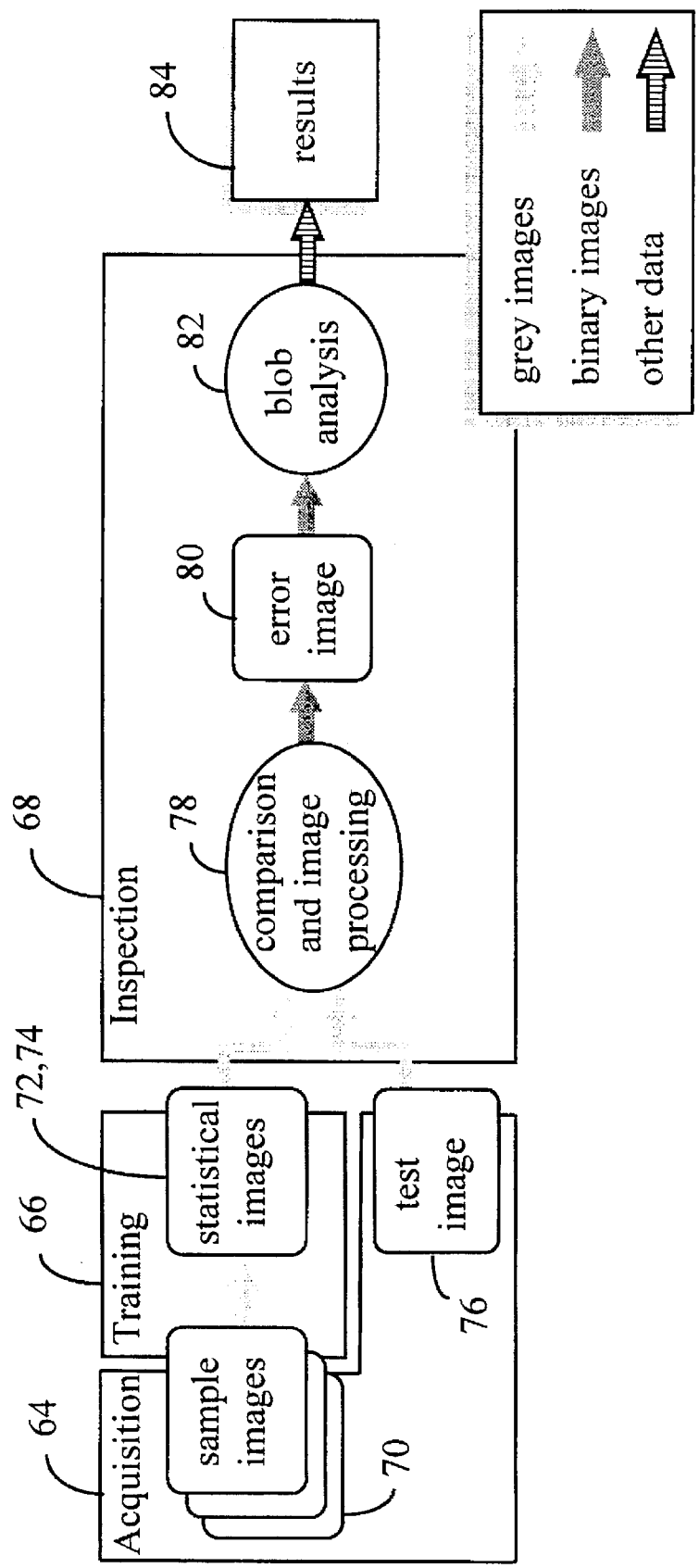
FIG. 7 is a flow diagram illustrating Golden Template Comparison.

FIG. 7 illustrates the GTC algorithm in its simplest conceptual form. GTC includes two major phases: an acquisition and training phase 64, 66, and an inspection phase 68. During the acquisition phase 64, an ensemble of various sample images 70 are acquired, each of which is representative of correct or passing criteria. During the training phase 66, a golden template image 72, and a standard deviation image 74 are constructed from the sample images 70. The inspection phase 68 of GTC compares 78 an image 76 of an object under test, called a test image 76, to the golden template image 72. To compare the test image 76 to the golden template image 72, the two images 72, 76 are registered with respect to each other, preferably using the efficient image registration method described herein, and claimed in application Ser. No. 08/299,015, now U.S. Pat. No. 5,548,326 and then subtracted to provide a difference image (not shown).

In the training phase 66, the efficient image registration method can also be used to register the sample images 70 to construct the golden template image 72 and the standard deviation image 74.

Next, the difference image is compared to a threshold image (not shown) that is computed using the standard deviation image 74, by a method described below, to provide a binary error image 80, where each pixel of the binary error image 80 has a value that indicates whether or not the value of the threshold pixel has been exceeded by the corresponding pixel of the difference image.

The error image 80 then undergoes a blob analysis 82 (a process for computing geometric, topological, and other properties of a plurality of connected pixels), and the results of the blob analysis are stored in a data structure called a results structure 84. The results of the blob analysis include a count of the defect pixels found, and the blob analysis of the defect pixels.

Thus, the basic idea of GTC is to compare a test image to a statistical composite image of a known good scene by subtracting the test image from the composite image (golden template) and then looking for significant differences between the two images. Although straightforward in principle, in practice GTC is not effective unless careful attention is paid to the following issues: illumination and contrast variation, sub-pixel misregistration, grey-level defect criteria, geometric and morphological defect criteria, and training the golden template from real-world samples.

Defects cannot be detected unless they cause image variations that substantially exceed the image variation obtained across the set of good samples. Well-designed optics and illumination can maximize the image variations resulting from defects. Good image analysis procedures substantially reduce image variation across the set of good samples, resulting in increased sensitivity to defects.

We now define the basic GTC algorithm. We can write the basic GTC algorithm as follows:

$$|I-T| \geq t \quad (4)$$

where I represents the image of the scene to be analyzed for defects (the input image), T represents the golden template image, and t represents the defect threshold.

Here, upper case boldface characters are used to represent images, and lower case characters to represent scaler quantities. Unless otherwise stated, operators applied to images indicate that the operation is to be applied to each pixel individually. For example, in equation (4) the absolute value of the difference of each pixel of I is compared to the corresponding pixel of T to the threshold t. If any pixel of I differs from the corresponding pixel of T by at least the threshold value t, then the sample contains a defect.

The causes of image variation among good samples will now be discussed- Here are the reasons that a good sample will give rise to an image that is different from the template:

Process variations: any reproduction process will give rise to reflectivity variations that are to be considered normal and acceptable. The magnitude of such variations is clearly application dependent. To complicate matters, the magnitude of variation may be highly dependent on image position—some regions may be very consistent while others vary considerably from sample to sample.

Scene misregistration: all mechanical positioning devices are subject to errors that cause the position of a given sample relative to the imaging device to vary from the position of the sample or samples used to create the template. Scene misregistration is typically the largest component of image intensity variation among good samples. For small misregistrations, the resulting intensity difference at a given point in the image is equal to the dot product of the misregistration vector and the image intensity gradient at that point. Thus, in uniform regions (characterized by low gradient) small misregistration gives rise to insignificant intensity variations; in nonuniform regions (characterized by high gradient), for example in the neighborhood of edges, small misregistration results in substantial image intensity variations.

Video noise: present in all imaging devices, video noise results in small intensity variations. Typically video noise is uniform but spatially uncorrelated—the magnitude of variation over a set of images is the same for all pixels, and the variation at a given pixel in a given image is independent of that of its neighbors.

Imaging variations: Illumination intensity and video amplifier gain and offset may vary over time or temperature, resulting in small image variations. The variations in a given image are spatially correlated among all pixels.

Scene reflectivity variations: Overall reflectivity may vary from sample to sample, or from one region of a sample to another. For example, on semiconductor wafers, the transparency of the passivation layer may vary from wafer to wafer or even across a single wafer. These variations are typically small and spatially correlated.

Template errors: The golden template itself may not be fully representative of the typical good sample. The scene from which the template was trained may contain undetected defects. Even if the training scene is flawless, its image is just as subject to the above problems as are the test images.

image variation among good samples can be addressed in a variety of ways, each of which addresses one or more of the above mentioned causes. For example, scene misregistration can be dealt with using a suitable registration technique. Registration can be divided into two distinct phases: whole-pixel registration, discussed in this section, and sub-pixel registration, discussed below.

The purpose of whole-pixel registration is to determine the subset of the scene in the camera's field of view that corresponds to the golden template by measuring the (x,y) shift of the scene with respect to the golden template scene. We refer to this as whole-pixel registration because, although the actual scene shift is arbitrary, this subset, which becomes the GTC input image, is restricted to align with a fixed pixel grid.

Ideally, whole-pixel registration will result in a scene misregistration error of no more than ±½ pixel in x and y. For the purposes of the discussion in the previous section, it is reasonable to call this a small misregistration, and conclude that its detrimental effect is a function of image gradient.

The whole-pixel registration method must be fast and accurate, must operate on arbitrarily complex scenes, and must tolerate changes in image contrast, video noise, and image degradation. The method should also provide sub-pixel measurement accuracy for use in the sub-pixel registration step described below. A method that satisfies these requirements is gray-scale normalized correlation. To maintain accuracy and to operate on complex scenes, large correlation templates are generally required (40×40 pixels and up). It has been shown that large template correlation is practical on cost-effective hardware.

However, although grey-scale normalized correlation satisfies the above-mentioned requirements, it's performance leaves something to be desired in applications where occlusion of the test image is a problem, such as in printing applications. In this case, the defect in the test image may occlude or alter the alignment location in the test image, making accurate registration of the golden template image to the test image difficult or impossible. As recognized by the invention, this is because maximizing normalized correlation coefficients find the registration location that minimizes the normalized sum of the squares of the grey-level image differences between the golden template image and the test image. If there is a defect on the test image at the registration model location, the defect will cause the square of the difference to be very large, possibly preventing the location of the correct registration location.

The invention instead uses a minimization of the sum of absolute differences of the grey levels between the golden template image and the test image. Consequently, if there is a defect in the test image, the absolute differences will be added to the sum, rather than the differences squared. This makes the alignment procedure less sensitive to occlusion of a registration model or fiducial mark. The registration method of the invention is also less sensitive to "outliners", i.e., spurious marks and other defects, than normalized correlation.

An unexpected benefit of the registration method of the invention when used with the Golden Template Analysis is that it is more compatible with the Golden Template Analysis than normalized correlation. In GTC, the golden template image is subtracted from a test image, and the difference pixels or absolute difference pixels are considered to represent defects. The image registration technique of the invention exactly minimizes the sum of these absolute differences or the sum of GTC defects. Thus, using the image registration technique of the invention finds the registration position that yields the fewest total grey level defects.

Another benefit of the registration technique of the invention is that the registration target (or "alignment target") does not need to be "trained". The registration target can consist of multiple windows in the golden template image. At runtime, the same registration target that was used for building the Golden Template image is used for registering the test image with the Golden Template image.

After whole-pixel registration is performed, sub-pixel registration is executed. According to the invention, both the whole pixel and sub-pixel registration steps are accomplished by minimizing the sum of absolute differences between the Golden Template image and the registration target of the test image.

Sub-Pixel Registration

After whole-pixel registration is performed, a $\leq$½ pixel misregistration error remains that will cause substantial image variations in regions of high gradient. This residual error is called the sub-pixel phase of the scene.

Although the whole-pixel registration step can only shift the image by an integral number of pixels, it can measure the actual scene shift to sub-pixel accuracy. In practice, it is reasonable to expect approximately ±⅛ pixel accuracy from a good interpolation method. This sub-pixel phase measurement can be used with a digital resampling algorithm to shift the input image by an amount in the range ±½ pixel, compensating for the misregistration error left after whole-pixel registration.

There are two ways of implementing digital resampling: perform the resampling on the input image at run time, or store a number of re-sampled golden templates at training time and simply choose the appropriate one at run time. This is a classic memory/speed tradeoff. To do the resampling at run time and satisfy our speed requirements would require special hardware, use of a crude algorithm, or both. There will be a run-time speed penalty regardless, but no extra memory is needed. To store the templates as a training step would require large amounts of memory, but allows the use of expensive but more effective resampling algorithms and results in no run-time speed penalties.

Storing sixteen 512×512-pixel templates requires 4 Mbytes of memory and provides ±⅛ pixel precision. Any additional precision would be of little value due to accuracy limitations of both shift measurement and resampling. In practice, nine templates would usually suffice (±⅙ pixel resolution). For systems that must hold many different templates, mass storage can be used. Since the nine or sixteen sub-pixel shifted versions of a template are almost identical, data compression techniques can provide considerable savings in mass storage.

Based on the speed and effectiveness considerations, as well as the low cost of memory and mass storage, it is preferable to store multiple shifted templates. There is another even stronger argument for doing so. The resampling algorithm is an attempt to predict the appearance of shifted scenes from a sampled image. The prediction is based on a simple mathematical model of how the sampled image is obtained from a continuous one, and certain assumptions regarding the spatial frequency content of the scene. In practice, the model does not completely reflect how images are actually obtained from cameras, and the assumptions often do not hold. Rather than attempting to predict the appearance of shifted scenes, it is better simply to measure it. This requires storing the shifted templates, because there is no way to compute them at run time.

The accuracy of x-y positioning stages is often insufficient to obtain the shifted templates simply by moving the scene by fractional pixel amounts. Instead, the preferred approach is to augment the statistical training procedure to achieve the desired result. A series of good scenes are presented at essentially random sub-pixel phases. Then, the efficient image registration method of the invention, just as in the whole-pixel registration step, determines which sub-pixel "bin" a given sample belongs to. If we average all of the images that fall into each such bin, we will obtain an excellent representation of the appearance of the scene at each sub-pixel phase. As long as sufficient number of samples are used, positioned randomly, the results should be more representative than any resampling algorithm. Furthermore, this procedure automatically compensates for any systematic bias in the measurement of sub-pixel phase, since the same measurement algorithm that will be used at run time is used to choose the bins for training. Finally, this procedure is a trivial addition to the standard statistical training procedure, far simpler to implement than even the simplest resampling methods.

Global Contrast Normalization

The purpose of global contrast normalization is to compensate for conditions that cause image intensity to vary in ways that do not depend on position in the image. Examples include variations in illumination intensity, amplifier gain and offset, lens aperture, and scene contrast. The goal is to compute a function m and apply it to each pixel in the input image, so that the GTC algorithm becomes:

$$|m(I)-T| \geq t \quad (5)$$

The function m is computed by comparing the statistics of I and T, based on the assumption that the majority of pixels in I are uncontaminated by defects. If the assumption does not hold then m may be wrong, but in this case I is so severely degraded that it probably doesn't matter—the scene will be judged a reject regardless.

We have investigated three methods for computing m:

min/max (MM): Here m is a linear function chosen such that the minimum and maximum intensity values of m(I) match that of T. Since strict min and max are unreliable, we use values corresponding to, for example, 1% and 99% of the cumulative intensity distribution.

mean/standard deviation (MSD): Here m is a linear function chosen such that the mean and standard deviation of the intensity values of m(I) match that of T.

histogram specification (HS): Here m is a monotonically non-decreasing function chosen such that the distribution of intensity values of m(I) matches that of T.

For images subject to linear intensity transformations, the three methods are about equally effective. The HS method is the more general because it can compensate for non-linear effects such as amplifier saturation. None of the methods are clearly superior (or inferior) in all cases, however, so the choice becomes application-dependent.

Local Contrast Normalization

The purpose of local contrast normalization is to compensate for conditions that cause image intensity to vary slowly with position in the image. We apply a high pass filter f before the absolute value step, so that the GCT algorithm becomes:

$$|f[m(I)-T]| \geq t \quad (6)$$

Statistical Template Training

The purpose of statistical training is to obtain a golden template that is representative of the population of good samples, so as to reduce the average variation between good samples and the template. As noted above, any individual sample is subject to process variations and video noise, but we can obtain a representative template by averaging many samples. For this to work, however, the images must be registered and must have identical global contrast. Thus, the efficient image registration method of the invention, and contrast normalization procedures, are an essential part of statistical template training.

It is also essential that the samples used for training be free of defects. If we can certify a small number of samples as being defect-free, then we can average them and then use the GTC algorithm itself to test new training samples for defects. Only ones found to be defect-free would be used for statistical training. The initial set of certified defect-free samples is called the seed set.

In certain applications, we can assume that defects are random from sample to sample. In this case, any sufficiently large set of samples that are substantially identical must be free of defects, otherwise the same defect would be present in all samples, in violation of our assumption. Thus, we can use GTC to find automatically a defect-free set to serve as the seed set.

Statistical training will also be seen to be important in sub-pixel registration and in determining photometric defect criteria, as will be described below.

Photometric Defect Criteria

The sensitivity to defects and susceptibility to false alarms of GTC is determined in any of the above forms by the defect threshold t. The threshold is a photometric defect criterion, because it classifies pixels as good or defective based on image intensity alone. In this section we will describe a better photometric defect criterion; in the next section we will discuss criteria that are based also on shape.

If the variability over the set of good samples were uniform for all pixels, a global threshold would be appropriate. We have seen, however, that this is not the case—variability is much higher in regions of high gradient, and normal process variations can be substantially nonuniform (this is particularly true of semiconductor wafers). In order to prevent false alarms, the threshold t must be set high enough to account for the worst case variability over all pixels. Thus, the sensitivity of GTC can be compromised by a tiny population of unreliable pixels.

Clearly, each pixel position should have its own threshold, so that the GTC algorithm becomes:

$$||f[m(I)-T]| \geq V \tag{7}$$

where V is a threshold image whose pixel values are set based on the variability expected over the set of good samples.

The best way to determine the variability at each pixel is to measure it as part of the statistical training procedure. In addition to computing the mean pixel value over the training set, we compute the standard deviation and use it to determine a threshold. This procedure automatically accounts for all nonuniform, as well as uniform, causes of variation—sub-pixel misregistration, process variations, and video noise. We compute the threshold image as follows:

$$V = t_1 S + t_2 \tag{8}$$

where S is the measured standard deviation image, and $t_1$ and $t_2$ are parameters.

In applications that do not suffer from nonuniform process variations, or where statistical training is not feasible, we can estimate V based on template gradient magnitude.

The image position-dependent component of the above photometric detect criteria is determined automatically by statistical training or image gradient; the user's only control is over the parameters $t_1$ and $t_2$. In practice, it is desirable to allow a human operator to edit V with some sort of image painting program, to raise or lower the automatically computed thresholds in selected regions based on application-dependent criteria. It should be possible for the operator to raise selected thresholds to values that exceed any possible absolute difference, effectively making those regions into "don't care" regions.

Geometric and Morphological Defect Criteria

One can dramatically increase sensitivity to small intensity variations by imposing additional criteria to prevent false alarms. These criteria can be based on the shape of a set of defective pixels.

In some applications, this is simply a way of trading intensity sensitivity for defect size sensitivity—we can detect small intensity variations if the defect is at least several pixels in diameter.

In other applications, we can increase sensitivity and reduce false alarms by designing shape criteria based on application-specific knowledge. For example, in graphic arts applications we may be looking for light streaks in a particular direction, caused by some printing malfunction. The streaks may result in image intensity variations that are in the range of normal variations due to, for example, video noise. If we detected a long line of pixels oriented in the particular direction, all varying from the template by a small amount, we could conclude that the variation was caused by a streak and not video noise.

We describe two methods for imposing defect criteria based on shape—one is based on geometrical measurements, and the other is based on gray-scale mathematical morphology. For both methods it is convenient to rearrange equation (7) and define a new image, the error image E:

$$E = |f[m(I)-T]| - V \tag{9a}$$

$$E \geq 0 \tag{9b}$$

Pixels in E are considered defective if they are $\geq 0$— this is the photometric defect criterion.

The geometric defect criteria are implemented by performing connectivity analysis on E and then measuring geometric properties of the connected regions: area, perimeter, orientation of principal axis of inertia, ratio of principal moments of inertia, and others. Some application-dependent classification scheme would be defined to determine, based on these measurements, the disposition of each connected region. The calculations are made by assigning a weight to each grey level in E by means of some mapping function w, so that photometric information can take part in the classification, and to maximize repeatability of results.

The morphological defect criteria are implemented by eroding E with one or more grey-level structuring elements, or probes, Pi, so that equation (9) becomes:

$$E_i = \{|f[m(I)-T]| - V\} P_i \tag{10a}$$

$$E_i \geq 0 \tag{10b}$$

Any values $\geq 0$ that remain in any image $E_i$ after erosion are considered defects. The probes Pi are designed to detect certain shapes. Examples are shown in Table 1, which is a probe designed to detect horizontal streaks, and Table 2, which is a set of 3 probes designed to detect spot defects of varying effective diameters.

TABLE 1

| -3 | -3 | -3 | -3 | -3 | -3 | -3 |
|----|----|----|----|----|----|----|
| 0  | 0  | 0  | 0  | 0  | 0  | 0  |
| -3 | -3 | -3 | -3 | -3 | -3 | -3 |

TABLE 2

| -8 | -5 | -4 | -5 | -8 | -16 | -10 | -8 | -10 | -16 | -32 | -20 | -16 | -20 | -32 |
|----|----|----|----|----|-----|-----|----|-----|-----|-----|-----|-----|-----|-----|
| -5 | -2 | -1 | -2 | -5 | -10 | -4  | -2 | -4  | -10 | -20 | -8  | -4  | -8  | -20 |
| -4 | -1 | 0  | -1 | -4 | -8  | -2  | -0 | -2  | -8  | -16 | -4  | 0   | -4  | -16 |

TABLE 2-continued

| | | | | | | | | | | | | | | |
|---|---|---|---|---|---|---|---|---|---|---|---|---|---|---|
| −5 | −2 | −1 | −2 | −5 | −10 | −4 | −2 | −4 | −10 | −20 | −8 | −4 | −8 | −20 |
| −8 | −5 | −4 | −5 | −8 | −16 | −10 | −8 | −10 | −16 | −32 | −20 | −16 | −20 | −32 |

The grey level erosion of one of these probes with the image E, as expressed in equation (10), can be understood as follows: In equation (9), any pixel of E that is $\geq 0$ is a defect, so 0 can be thought of as a defect threshold. The probes are neighborhood threshold templates. A defect exists if any probe can be placed in some position in E such that all E values over the range of the probe equal or exceed the corresponding probe values. In these examples, the central element is 0, corresponding to the normal photometric criterion expressed in equation (9b). The surrounding values are 0 or negative, meaning that the neighbors of the central element must also satisfy, or come close to satisfying, this criterion.

In conclusion, GTC as expressed in equation (4) will not work in practice due to extreme image variability over the set of good samples—one cannot distinguish these variations from true defects. A series of template training and image analysis methods has been presented that reduce this variation to the point where GTC can be used to detect defects reliably under real-world conditions.

Other modifications and implementations will occur to those skilled in the art without departing from the spirit and the scope of the invention as claimed. Accordingly, the above description is not intended to limit the invention except as indicated in the following claims.

What is claimed is:

1. A method for golden template analysis of a test image, the method comprising the steps of:
    acquisition of a plurality of sample images;
    acquisition of a test image;
    creating a golden template image using said plurality of sample images,;
    comparing said golden template image with said test image, including the steps of:
        registering said golden template image and said test image by minimizing a sum of absolute differences metric, and
        subtracting said golden template image from said test image to provide a difference image; and analyzing said difference image to provide comparison results.

2. The method of claim 1, wherein the step of creating a golden template image includes the step of:
    registering said plurality of sample images by minimizing a sum of absolute differences metric.

3. The method of claim 1, wherein said golden template image includes:
    a template image having a plurality of pixels, each pixel being the mean of a plurality of spatially corresponding pixels of the plurality of sample images; and
    a standard deviation image having a plurality of pixels, each pixel being the standard deviation of the plurality of spatially corresponding pixels of the plurality of sample images.

4. The method of claim 1, wherein said step of registering said golden template image and said test image includes a whole-pixel registration phase and a sub-pixel registration phase.

5. The method of claim 1, wherein said step of analyzing said difference image includes the steps of:

subtracting a threshold image from said difference image to provide an error image; and
    performing at least a geometric and topological analysis of said error image.

6. The method of claim 5, wherein said error image binarized prior to performing said at least geometric and topological analysis, wherein a first pixel value indicates that the corresponding absolute difference exceeded the threshold value for that pixel, and a second pixel value indicates that the corresponding absolute difference did not exceed the threshold value for that pixel.

7. The method of claim 5, wherein said threshold image is based on a linear mapping of a standard deviation image, and said standard deviation image is derived from said plurality of sample images, said linear mapping being determined at least partly by the effects of at least one of process variations, video noise, imaging variations, template errors, and scene misregistration.

8. The method of claim 1, wherein said step of registering said golden template image and said test image includes the steps of:
    (A) selecting an initial relative displacement between said golden template image and said test image such that a plurality of pixels of said golden template image are in overlapping relationship with a plurality of pixels of said test image;
    (B) computing a registration metric value corresponding to said initial relative displacement using a registration metric computation that includes the steps of:
        computing the difference between a gray value of each pixel of said golden template image and a gray value of the pixel of said test image that is in overlapping relationship with said each pixel of said golden template image;
        computing the absolute value of the difference between the gray value of each pixel of said golden template image and the gray value of each pixel of said test image that is in overlapping relationship with said each pixel of said golden template image; and
        computing a sum of absolute differences by computing the summation of each absolute value computed for each pixel of said golden template image that is in overlapping relationship with a pixel of said test image;
    (C) computing a registration metric value corresponding to each of a plurality of neighboring-pixel displacements using said registration metric computation;
    (D) determining which displacement among the plurality of neighboring-pixel displacements and said initial relative displacement resulted in the smallest registration metric value;
    (E) if the displacement that resulted in the smallest registration metric value is one of said plurality of neighboring-pixel displacements, repeating steps (A), (B), (C), (D), and (E) using said one displacement as said initial relative displacement; and
    (F) else, provide registration parameters corresponding to the most recent version of said initial relative displacement for placing said pair of digitized images in registered relationship.

9. The method of claim 8, further including the step of:
using said registration parameters for computing subpixel registration parameters.

10. The method of claim 8, wherein said test image is at least as large as said golden template image, and said initial relative displacement between said golden template image and said test image is selected such that each of the pixels of said golden template image is in overlapping relationship with at least one pixel of said test image.

11. The method of claim 8, wherein said golden template image includes
a region that includes a first plurality of pixels, each pixel of said first plurality of pixels being associated with a gray value,
and wherein said region is bounded by at least a second plurality of pixels, each pixel of said second plurality of pixels being associated with a don't-care symbol.

12. The method of claim 8, further including the steps of:
selecting a search area within said test image, said search area being defined by a search area boundary that can enclose as many as all of the pixels of said test image,
and wherein step (E) further includes the step of:
if the displacement that resulted in the smallest registration metric value falls outside of the search area boundary, providing registration parameters corresponding to the most recent version of said initial relative displacement for placing said pair of digitized images in registered relationship.

13. The method of claim 8, further including the steps of:
after step (B), storing said registration metric value in association with said initial relative displacement; and
after step (C), storing each said registration metric value in association with a corresponding neighboring-pixel displacement, and
wherein in step (E), whenever steps (A), (B), (C), (D), and (E) are repeated, a registration metric value for a relative displacement is calculated only if a registration metric value has not been previously calculated and stored in association with said relative displacement.

14. The method of claim 8, wherein said initial relative displacement between said first image and said second image is such that a first pixel that contains the centroid of said golden template image is in overlapping relationship with a second pixel that contains the centroid of said test image.

15. The method of claim 8, wherein the step of computing a registration metric value corresponding to each of a plurality of neighboring-pixel relative displacements is computed for the contiguous north, east, south, and west neighboring-pixel relative displacements.

16. The method of claim 8, wherein the step of computing a registration metric value corresponding to each of a plurality of neighboring-pixel relative displacements is computed for the contiguous north, east, south, west, north-east, south-east, south-west, and north-west neighboring-pixel relative displacements.

17. The method of claim 1, wherein said step of registering said golden template image and said test image includes the steps of:
(A) selecting an initial relative displacement between said golden template image and said test image such that a plurality of pixels of said golden template image are in overlapping relationship with a plurality of pixels of said test image;
(B) computing a registration metric value corresponding to said initial relative displacement using a Sum of Absolute Differences registration metric computation;
(C) obtaining a registration metric value based upon said Sum of Absolute Differences registration metric computation for each of a plurality of neighboring-pixel relative displacements, and iteratively selecting a new initial relative displacement from among said plurality of neighboring-pixel relative displacements such that each succeeding new initial relative displacement is associated with a smaller registration metric value, until an initial relative displacement that is associated with a minimum registration metric value is reached.

18. The method of claim 17, wherein the step of obtaining said registration metric value includes the steps of:
calculating a registration metric value for a relative displacement based upon said Sum of Absolute Differences registration metric computation only if a registration metric value has not already been calculated and previously stored in association with said relative displacement.

19. The method of claim 17, wherein said test image is at least as large as said golden template image, and said initial relative displacement between said golden template image and said test image is selected such that each of the pixels of said golden template image is in overlapping relationship with at least one pixel of said test image.

20. The method of claim 17, wherein said golden template image includes a region that includes a first plurality of pixels, each pixel of said first plurality of pixels being associated with a gray value, and wherein said region is bounded by at least a second plurality of pixels, each pixel of said second plurality of pixels being associated with a don't-care symbol.

21. The method of claim 17, further including the step of:
selecting a search area within said test image, said search area being defined by a search area boundary that can enclose as many as all of the pixels of said test image,
and wherein the step of iteratively computing a registration metric value also terminates when a succeeding new initial relative displacement falls outside of the search area boundary, whereupon registration parameters are provided corresponding to the most recent version of said initial displacement that does not fall outside of the search area boundary.

22. The method of claim 17, further including the step of:
(D) providing registration parameters corresponding to the version of said initial displacement that is associated with said minimum registration metric value.

23. The method of claim 17, wherein said minimum registration metric value is a local minimum registration metric value.

24. The method of claim 17, wherein said initial relative displacement between said golden template image and said test image is such that a first pixel that contains the centroid of said golden template image is in overlapping relationship with a second pixel that contains the centroid of said test image.

25. The method of claim 17, wherein the step of computing a registration metric value corresponding to each of a plurality of neighboring-pixel relative displacements is computed for the contiguous north, east, south, and west neighboring-pixel relative displacements.

26. The method of claim 17, wherein the step of computing a registration metric value corresponding to each of a plurality of neighboring-pixel relative displacements is computed for the contiguous north, east, south, west, north-east, south-east, south-west, and north-west neighboring-pixel relative displacements.

27. The method of claim 1, wherein said step of registering said golden template image and said test image includes the steps of:

(A) selecting an initial relative displacement between said golden template image and said test image such that a plurality of pixels of said golden template image are in overlapping relationship with a plurality of pixels of said test image;

(B) computing a registration metric value corresponding to said initial relative displacement using a Sum of Absolute Differences registration metric computation;

(C) locating a relative displacement that is associated with a minimum registration metric value using a two-dimensional numerical optimization analysis.

28. The method of claim 27, further including the step of:
based on said relative displacement that is associated with said minimum registration metric value, computing sub-pixel registration parameters.

29. The method of claim 27, further including the step of:
after step (C), calculating a difference image based upon a difference between said golden template image and said test image, wherein said golden template and test images are relatively displaced according to said relative displacement that is associated with said minimum registration metric value.

30. The method of claim 27, step (C) further including the step of:
calculating a registration metric value for a relative displacement based upon said Sum of Absolute Differences registration metric computation only if a registration metric value has not already been calculated and previously stored in association with said relative displacement.

31. The method of claim 27, wherein said test image is at least as large as said golden template image, and said initial relative displacement between said golden template image and said test image is selected such that each of the pixels of said golden template image is in overlapping relationship with at least one pixel of said test image.

32. The method of claim 27, wherein said golden template image includes a region that includes a first plurality of pixels, each pixel of said first plurality of pixels being associated with a gray value, and wherein said region is bounded by at least a second plurality of pixels, each pixel of said second plurality of pixels being associated with a don't-care symbol.

33. The method of claim 27, further including the step of:
selecting a search area within said test image, said search area being defined by a search area boundary that can enclose as many as all of the pixels of said test image,
and wherein said relative displacement, of the step of locating a relative displacement that is associated with a minimum registration metric value, does not fall outside of the search area boundary.

34. The method of claim 27, wherein said two-dimensional numerical optimization analysis is a gradient descent analysis.

35. The method of claim 27, wherein said two-dimensional numerical optimization analysis is a steepest descent analysis.

* * * * *